Cheney & Perry,
Hat.

No. 92,704.          Patented July 20, 1869.

WITNESSES          INVENTOR
Orville Peekham      Edward S. Cheney,
James W. Stillman     Geo. P. Perry

United States Patent Office.

EDWARD S. CHENEY AND GEORGE P. PERRY, OF PROVIDENCE, RHODE ISLAND.

Letters Patent No. 92,704, dated July 20, 1869.

IMPROVEMENT IN ENAMELLED HATS.

The Schedule referred to in these Letters Patent and making part of the same.

*To all whom it may concern:*

Be it known that we, EDWARD S. CHENEY and GEORGE P. PERRY, both of the city and county of Providence, in the State of Rhode Island, have invented a new and useful Improvement in the Manufacture of Hats; and we do hereby declare that the following specification, taken in connection with the drawings making a part of the same, is a full, clear, and exact description thereof.

Our invention is employed by the use of the hereinafter-described means and processes, or a substantial and material part thereof, resulting in the production of an article which we designate an "enamelled hat."

A "foundation" is first prepared, which may be made from buckram or other suitable material, by any of the well-known processes, either by blocking the same, by the aid of heated dies, or in any other convenient manner.

The foundations are then, by preference, coated with a composition, which will fill the pores of the cloth. We have found a preparation of dissolved rubber, whiting, and linseed-oil, mixed together in equal proportions, to be the best for the purpose, for the reason that the rubber gives elasticity and toughness to the foundation, and renders it less liable to crack upon being bent, while the other materials give a smooth outside surface, and fill the pores of the cloth. Other similar compositions, like those used in the manufacture of flock-covered hats, may be employed for the same purpose with good effect.

Figure 1:
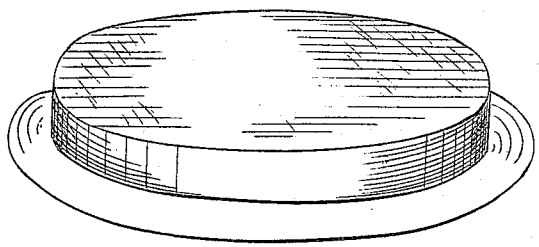
Figure 1 is a view of the "foundation" of a hat.
Figure 2:
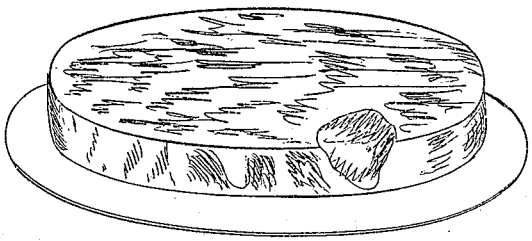
Figure 2 is a view of the finished article, ready for trimming.

The composition may be applied with a brush, and is allowed to become dry, when the foundation appears as shown at fig. 1.

The next operation consists in coating the prepared foundation with an enamelling-composition, which is to be prepared and applied as more particularly described in the Letters Patent granted to Charles L. Robertson, dated April 2, 1867, to which reference may be had.

The result is a hat ready to receive the trimming, which is distinguished by its smooth, glossy appearance, its flexibility, lightness, and ability to shed water.

We do not mean to be understood as confining ourselves to the employment of a composition of the same elements, in the same proportions described in said Robertson's patent, but any other composition of the same general character, possessing the same qualities, and capable, upon the application of heat, to develop a lustre, may be used.

Hats rendered impervious to the weather by means of exterior applications of paints, oils, varnishes, and ethereal japans, or other similar compounds, hardened by ordinary exposure to evaporation, are not new. Our invention differs from all such, in the fact that by developing the lustre with heat, a surface is formed, not only weather-proof, but in a degree vulcanized, and possessing a power to resist the ordinary action of heat.

The finish in our hat, as well as its durable properties, greatly depends upon the proper condition and mode of preparation of the material composing the foundation.

What we claim as our invention, and desire to secure by Letters Patent, is—

The improvement in the manufacture of hats, which consists in the application of a coating of enamelling-compound, substantially as described, upon a suitable foundation, and developing such composition by heat, as herein set forth, for the purposes specified.

EDWARD S. CHENEY.
GEO. P. PERRY.

Witnesses:
ORVILLE PECKHAM,
JAMES W. STILLMAN.